Dec. 29, 1925.

G. R. GREENSLADE 1,567,728

MEANS FOR TESTING BOILER STAY BOLTS

Filed Dec. 21, 1923    3 Sheets-Sheet 1

INVENTOR

Dec. 29, 1925.                                                     1,567,728
G. R. GREENSLADE
MEANS FOR TESTING BOILER STAY BOLTS
Filed Dec. 21, 1923            3 Sheets-Sheet 2
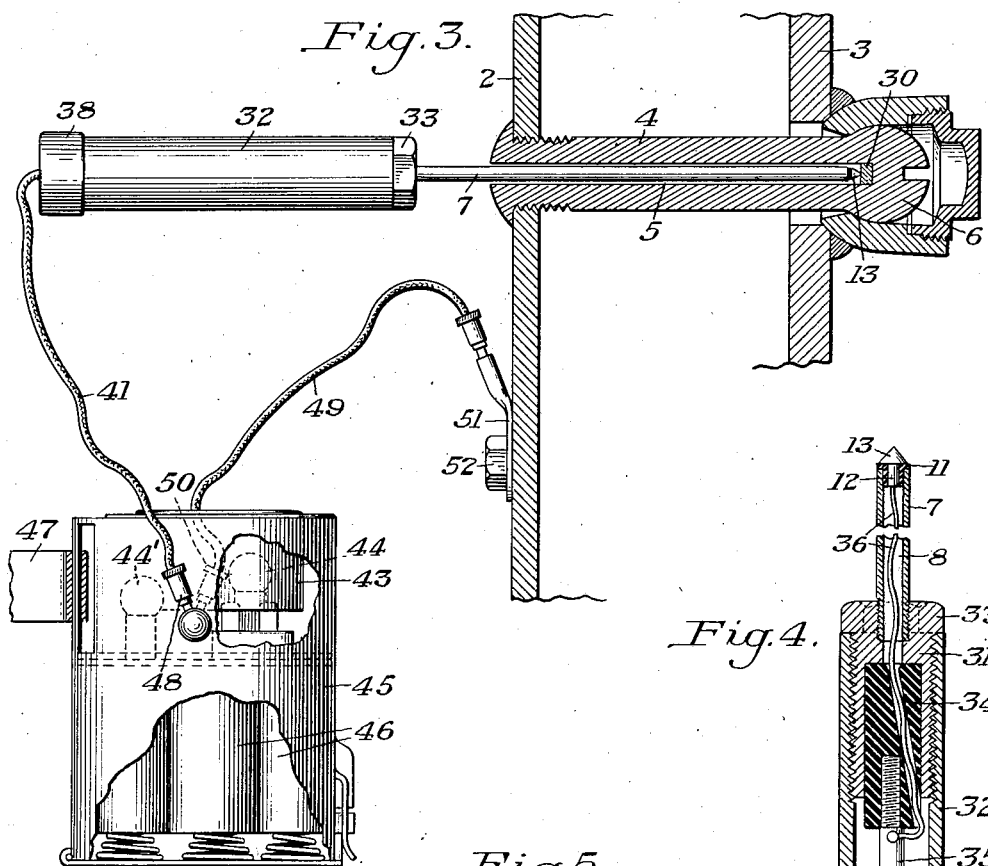
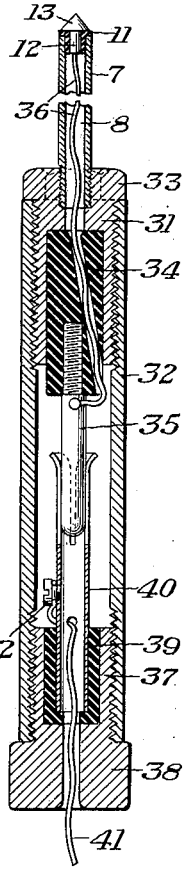
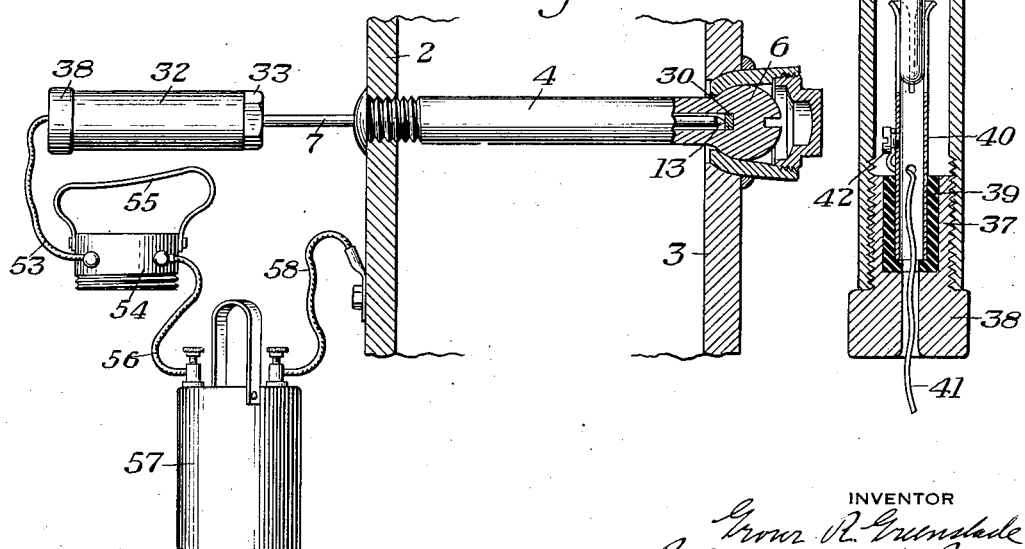
INVENTOR Dec. 29 1925.  1,567,728
G. R. GREENSLADE
MEANS FOR TESTING BOILER STAY BOLTS
Filed Dec. 21, 1923  3 Sheets-Sheet 3
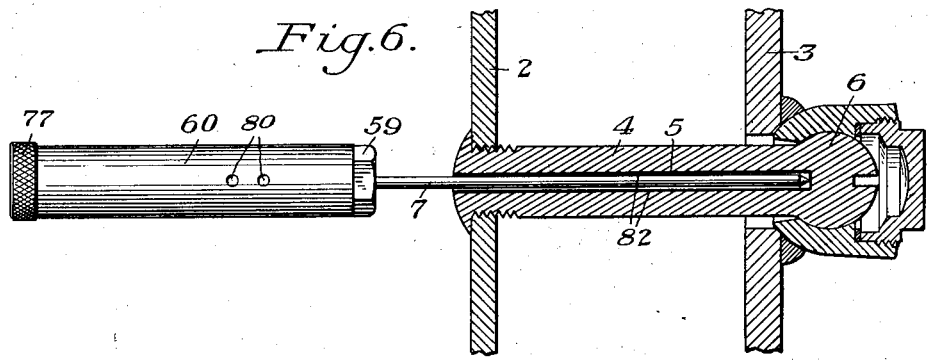
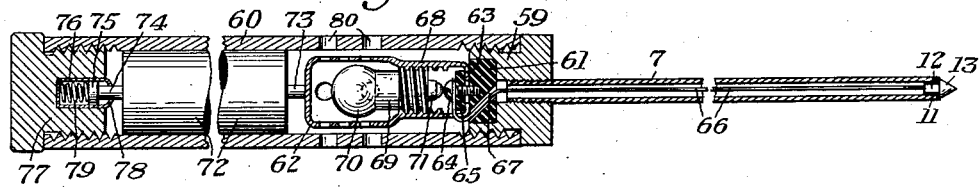
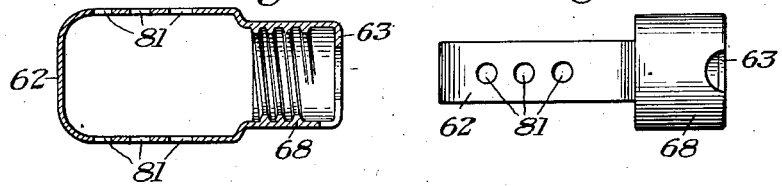 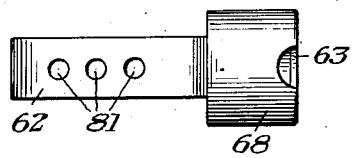
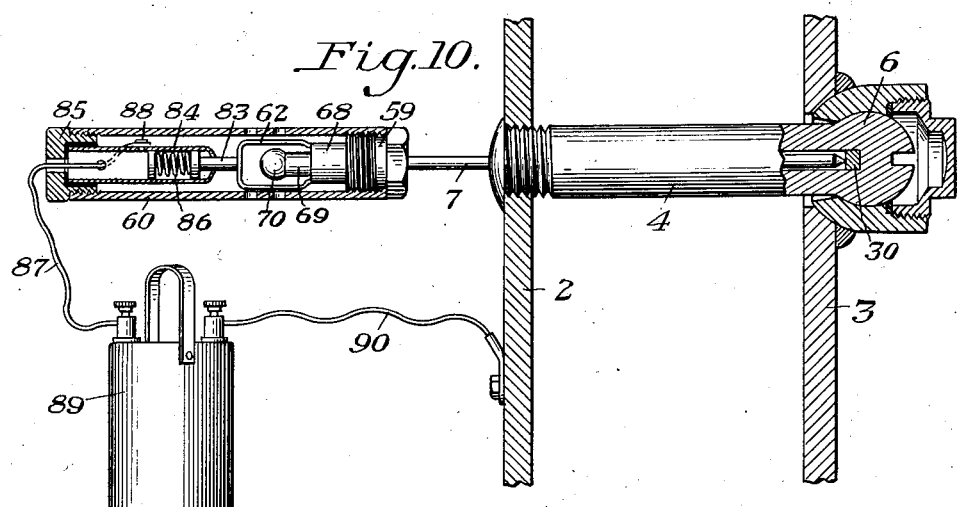
INVENTOR Patented Dec. 29, 1925.

1,567,728

UNITED STATES PATENT OFFICE.

GROVER R. GREENSLADE, OF PITTSBURGH, PENNSYLVANIA, ASSIGNOR TO FLANNERY BOLT COMPANY, OF PITTSBURGH, PENNSYLVANIA, A CORPORATION OF PENNSYLVANIA.

MEANS FOR TESTING BOILER STAY BOLTS.

Application filed December 21, 1923. Serial No. 681,955.

*To all whom it may concern:*

Be it known that I, GROVER R. GREENSLADE, a citizen of the United States, residing at Pittsburgh, county of Allegheny, and State of Pennsylvania, have invented a new and useful Improvement in Means for Testing Boiler Stay Bolts, of which the following is a full, clear, and exact description.

The present invention relates broadly to the testing of boiler staybolts, and more particularly to the testing of the condition of the telltale holes of flexible staybolts.

The method of inspecting boiler staybolts heretofore has been by the "hammer test", which is made by an inspector tapping the end of each staybolt with a hammer and ascertaining from the sound whether the bolt is fractured. This is an uncertain test, at best, even when made by an experienced and skillful inspector. Moreover, this form of test is very expensive when applied to flexible boiler staybolts, for the reason that United State Government regulations require that in making the test, the cap of every flexible staybolt assemblage be removed and the test made upon the headed end of each bolt. In the co-pending application of John Rogers Flannery, Serial No. 681,965, filed of even date herewith, there is disclosed a novel method of inspecting boiler stay-bolts, designed to supersede the hammer test and, therefore, of particular importance in connection with flexible staybolts, in that it does not necessitate the removal of the caps of the flexible staybolt assemblages.

This new method of inspection requires that each staybolt be provided with a telltale hole extending from the inner end of the bolt axially thereof, and preferably into, but not through the headed outer end portion thereof, and comprises periodically testing the condition of such telltale holes to determine whether they are open throughout the entire length thereof, drilling out such holes as the test shows are obstructed to remove the obstructing material, and finally applying pressure, preferably hydrostatic, to the boiler and determining the fractured or broken bolts by observing leakage through the telltale holes thereof.

In carrying out the above novel method of inspection, it becomes of paramount importance that the condition of the telltale holes prior to the application of the hydrostatic test be determined with certainty, so that when the latter test is made, all of the telltale holes may be open throughout the entire length thereof. This will be apparent from the following considerations. When a staybolt becomes fractured in service to such an extent that the crack reaches the telltale hole, water will begin to enter the telltale hole and will pass out through the porous plug in the mouth of the hole either in the form of steam or drops of water and the telltale hole will gradually fill up with scale formed largely from the deposit left by the water which evaporates in the telltale hole. The deposit left in this manner will accumulate more or less rapidly, depending on the hardness of the water, and may in time completely close the telltale hole at at least some point therein. If, therefore, the hydrostatic test is made with the telltale hole in this closed condition and the fracture is located between the point of closure and the original closed outer end of the telltale hole, the hydrostatic test will not show leakage through the telltale hole and the inspector will not know that the bolt is fractured. Experience has demonstrated that a flexible boiler staybolt is very liable to fracture adjacent the headed end thereof. Consequently, the test of the condition of the telltale holes of the bolts, to be of any practical value in this new method of inspection, must show with certainty whether such telltale holes are open clear through from their mouths to their original closed outer ends. If all telltale holes were of the same length and such lengths were known to the inspector, it would be possible to determine whether they were open throughout their entire length by inserting a rod into each telltale hole and observing whether it could be moved therein a distance equal to the length of the hole. In ordinary boiler construction, however, the staybolts used may vary in length from six inches to thirty inches. In all cases where there is a variation in bolt length, there will be a corresponding variation in the lengths of the telltale holes, so that the above method of testing by inserting a rod into each telltale hole would not be effective.

In the co-pending application of John Rogers Flannery and William McClure Wilson, Serial No. 453,220, filed March 18, 1921, there is disclosed a method and a means for determining the condition of the telltale holes of staybolts which comprises placing an indicating material within the original closed outer end portion only of the telltale hole of each bolt at the time the bolt is incorporated in a boiler structure, closing the mouth of the hole with a plug, and at inspection time removing the plug and inserting a testing rod in such hole and moving it to the limit of its movement therein. If, upon withdrawal of the rod, the end thereof is discolored or if it has some of the indicating material sticking thereto, this shows that the original closed outer end of the hole has at least been approximately reached and that the hole is open substantially clear through from its mouth to its original closed outer end.

By the present invention, I have provided improved means for testing the condition of telltale holes of staybolts, which means comprises a testing device adapted to be inserted into the telltale hole of a staybolt and having indicating means associated therewith adapted to function only when the testing device makes actual mechanical contact with the original closed outer end of the hole.

In the accompanying drawings, there are shown, for purposes of illustration only, certain embodiments of my invention, it being understood that the drawings do not define the limits of the invention, as changes may be made in the construction and operation therein disclosed without departing from the spirit of the invention or scope of the appended claims.

In the drawings:

Figure 3 is a view similar to Figure 1 of another form of my invention;

Figure 4 is a longitudinal sectional view of the testing implement shown in Figure 3;

Figure 5 is a view similar to Figure 1 of still another form of my invention;

Figure 6 is a view similar to Figure 1 of a further form of the invention;

Figure 7 is a longitudinal sectional view of the testing means shown in Figure 6;

Figures 8 and 9 are detail views of parts of the construction shown in Figures 6 and 7; and Figure 10 is a view similar to Figure 1 of a still further form of my invention.

Figure 1:
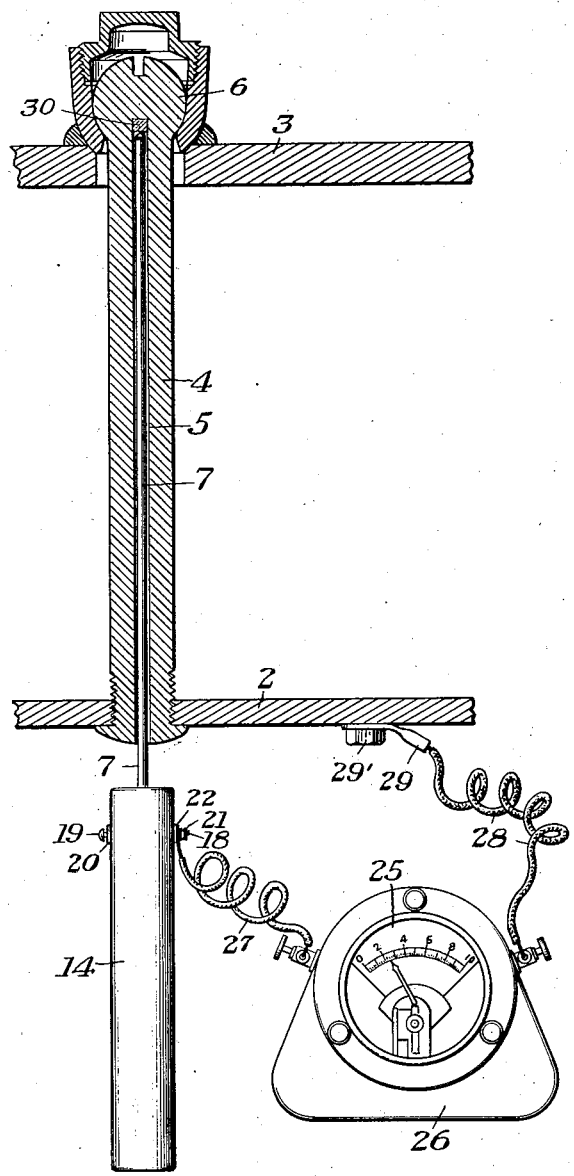
Figure 1 is a view illustrating one embodiment of my invention and the manner in which it is employed to test the condition of the telltale hole of a staybolt, the staybolt and portions of the inner and outer sheets of the boiler being shown in section.

Referring to Figure 1, the reference numerals 2 and 3 designate portions of the inner and outer boiler sheets and 4 a flexible staybolt associated therewith. This bolt is provided with a telltale hole 5 extending from the inner end of the bolt axially thereof into, but not through, the head 6 of the bolt.

Figure 2:
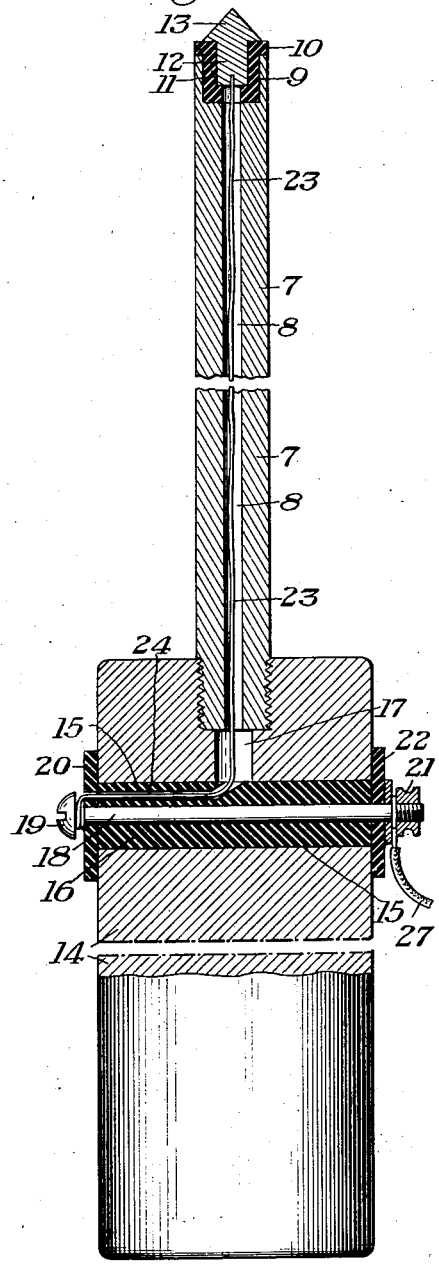
Figure 2 is a longitudinal sectional view of the testing implement shown in Figure 1.

In the embodiment of the invention shown in Figures 1 and 2, the testing means comprises a testing implement in the form of a tube 7, the diameter of which is slightly less than the diameter of the telltale hole 5 of the staybolt. This tube is preferably made of steel and is provided with an axial bore 8 of relatively small diameter. A recess 9 is provided in one end portion of the tube and a block 10 of insulating material is fitted in said recess and projects beyond the end of the tube, the projecting portion being seated upon the end of the tube and being of the same diameter as the tube. This block is formed with a socket 11 therein communicating through the base of the block with the bore 8, and embedded in said socket is the shank 12 of a tapering or conical contact point 13. The diameter of the base of the contact point is substantially less than the diameter of the tube, so that, when the implement is inserted into the telltale hole, the contact point cannot come into engagement with the side walls of the telltale hole.

The opposite end portion of the tube 7 is threaded into a handle member 14 provided with a transverse bore 15, in which is located a sleeve 16 of insulating material. The bore 15 intersects a longitudinally extending passage 17, which passage establishes communication between the bore 8 and the said bore 15. Extending through the sleeve 16 is a rod 18 provided at one end with a slotted head 19 separated from the handle member by a disk 20 of insulating material, the other end of the rod being screw threaded and having a nut 21 mounted thereon and separated from the handle member by a disk 22 of insulating material. An insulated conductor 23 is connected at one end to the shank 12 of the contact point 13 and extends through the bore 8 and passage 17 and through a passage 24 in the sleeve 16, and has its opposite end fastened under the head 19 of the rod 18.

The testing implement has associated therewith an indicating device which may be an ammeter 25 of usual construction housed in a portable casing 26 containing one or more dry cells connected in circuit with the ammeter. An insulated conductor 27 has one end fastened under the nut 21 and its other end connected to one terminal of the ammeter circuit, the other terminal of said circuit having one end of an insulated conductor 28 secured thereto. The free end of the latter conductor is provided with a suitable contact member 29 adapted for temporary electrical connection with some portion of the firebox, or other part of the boiler structure, as by means of a binding screw 29'.

The manner of using the testing means above described to determine whether the telltale hole of a bolt is open and unobstructed throughout the entire length thereof is as follows: The inspector making the test will connect the end 29 of the conductor 28 with the inner or firebox sheet 2 of the boiler, or with some other suitable part of the boiler structure with which the staybolt may have electrical connection, and will then thrust the testing implement 7 into the telltale hole 5 of the bolt and move it therein to the limit of its movement. If the telltale hole is not obstructed by reason of accumulation therein of solid material, the inspector will be enabled to effect contact between the contact point 13 and the original closed outer end of the telltale hole, thereby closing the electric circuit which includes the ammeter, the latter giving visual indication of the fact of the closing of the circuit. Should the ammeter fail to function when the inspector moves the testing implement in the telltale hole to the limit of its movement therein, such failure of the ammeter to function will at once indicate to the inspector that the telltale hole is obstructed and that the same should be cleaned out in order to insure that it will function properly when the hydrostatic test is applied.

It is contemplated that when a staybolt having a telltale hole therein is incorporated in a boiler structure, it will have its mouth closed by a plug during the intervals between inspections in order to prevent obstructing matter from entering the telltale hole from the firebox. This plug will preferably be porous so that a slight amount of moisture is liable to enter the telltale hole from the firebox through the porous plug and condense on the walls of the telltale hole. Since the staybolt is made of ferrous metal, this moisture may in time cause a slight amount of rust or corrosion on the walls of the telltale hole. Rust or corrosion is highly resistant to the passage of an electric current. Therefore, in order to insure the contact point 13 of the testing implement making a good electrical connection with the bolt when it engages the original closed outer end of the telltale hole; such end may be covered with a material which will not rust or corrode and which is a good conductor of electricity. This may be done by placing a slug 30 of copper or other non-corrosive conducting material in the original outer closed end of the telltale hole when such hole is formed. When this is done, the slug will, of course, constitute the original closed outer end of the telltale hole. Instead of merely covering the closed outer end of the telltale hole, the entire surface of the hole may be covered with an electrical conducting material which will prevent rust or corrosion, thus avoiding any possibility of the hole becoming obstructed by rust or corrosion. This covering may conveniently be made by electroplating the telltale hole.

It is possible to assume a condition where the obstructing matter, usually boiler scale, within the telltale hole might serve to close the circuit. Experience has demonstrated, however, that in such cases the resistance of such matter to the passage of an electric current is so great that the ammeter needle, when an ammeter is used, is deflected by a small part only of its normal deflection. With other forms of electrical indicating means, similar results may be observed. Therefore, when the inspector upon inserting the testing implement into the telltale hole and moving it therein to the limit of its movement, observes that the ammeter needle is either not deflected at all or is only deflected by a small part of its normal deflection, he will know that the telltale hole is obstructed and that it should be cleaned out.

In the form of the invention illustrated in Figures 3 and 4, the testing implement is of the same construction as in the form of the invention illustrated in Figures 1 and 2, except as to construction of the handle member. The testing means shown in Figures 3 and 4 further differs from that shown in Figures 1 and 2 in that the indicating device associated with the testing implement is in the form of a combined ammeter and light. The tube 7 in the latter figures is threaded into a sleeve or socket member 31, which is tapped into one end of a tubular handle member 32, the said sleeve or socket member projecting beyond the end of the handle member to provide a head 33 for co-operation with a wrench. The end portion of the sleeve or socket member 31 within the handle member 32 has a plug 34 of insulating material fitted therein. This plug carries a contact finger 35, which projects into the bore of the handle member. An insulated conductor 36 is connected at one end with the contact finger 35 and extends through the plug 34 and through the bore of the tube 7, and has its other end connected to the shank of the contact point.

A sleeve or socket member 37 is tapped into the opposite end of the handle member and has a head 38 projecting beyond the end of said handle member. The end portion of the member 37 within the handle member has a hollow plug 39 of insulating material fitted therein and receiving an end portion of a spring socket member 40, which projects from said plug and receives the projecting end portion of the contact finger 35. An insulated conductor 41 is fastened at one end to the socket member 40 by means of a binding screw 42 and extends into and through the bore of the socket member and out through the member 37.

The indicating device comprises an ammeter 43 and an electric lamp 44 enclosed within a casing 45, the said casing containing a plurality of dry cells 46 included in circuit with the ammeter and the lamp. The casing also houses an extra lamp 44', so that if the lamp 44 burns out, the extra lamp will be available. This casing is comparatively small and may be fastened to the body of an inspector by means of a strap 47. The conductor 41 is connected at its other end with a binding post 48, which constitutes one terminal of the circuit including the ammeter 43 and lamp 44 and the battery 46. Another conductor 49 is connected at one end with a binding post 50, which constitutes the other terminal of said circuit, and is provided at its other end with a contact member 51 adapted to be electrically connected with the boiler sheet 2 in any suitable manner, as by means of a binding screw 52.

The operation of the testing means shown in Figures 3 and 4 is exactly the same as the operation of the testing means shown in Figures 1 and 2. When the inspector inserts the testing implement into the telltale hole 5 of the bolt and moves it to the limit of its movement therein, if the contact point 13 reaches and makes contact with the original closed outer end of the telltale hole, the electric circuit, including the ammeter 43 and lamp 44, will be closed and the ammeter needle will be deflected and the lamp lighted. On the other hand, if the ammeter needle is not deflected and the lamp not lighted, the inspector will know that the original closed outer end of the telltale hole has not been reached. By providing a lamp in connection with the ammeter, the latter will be illuminated so that the inspector may readily determine whether the circuit has been closed, even in a dark place, and moreover, the lamp furnishes additional resistance in the circuit and thereby increases the life of the dry cells.

The construction shown in Figure 5 is identical with the construction shown in Figures 3 and 4, so far as concerns the testing implement and its handle. In this form of the invention, however, the battery for the indicating device is not housed in the same casing with the ammeter and lamp. In this construction the testing implement is connected by a conductor 53 with one terminal of the indicating device, which is arranged in a separate casing 54 adapted to be applied to the body of the inspector by means of a strap 55. The other terminal of the indicating device is connected by a conductor 56 with one terminal of the battery 57, the other terminal of said battery having a conductor 58 connected thereto which is adapted to make electrical contact with the boiler sheet 2 in the same manner as in the construction shown in Figures 3 and 4.

With the construction shown in Figure 5, the battery 57 may be located at any convenient point near the boiler being inspected, while the inspector may strap the indicating device to his body.

The form of the invention illustrated in Figures 6 to 9 inclusive differs from that shown in any of the preceding figures, in that in the latter form of the invention the indicating device is contained within the handle of the testing implement and the circuit of the indicating device is adapted to be closed by both terminals thereof making contact with the walls of the telltale hole. The tube 7 of the testing implement has an externally threaded end portion screwed into a sleeve or socket member 59 tapped into one end of a tubular handle member 60. The end portion of the member 59 within the handle member has a plug 61 of insulating material fitted therein and a stirrup 62 located within the handle member has an inwardly projecting flange 63 at one end, which rests against the plug 61, the said stirrup being held in position on the plug by means of a screw 64, which latter passes through a disk 65 of insulating material resting upon said flange. An insulated conductor 66 is connected at one end to the contact point 13 and extends through the bore of the tube 7 and through a passage 67 in the plug 61, and thence through an opening in the stirrup, and has its other end secured under the head of the screw 64.

The stirrup 62 has a tubular internally threaded end portion 68 to receive the socket member 69 of an electric lamp 70. One terminal 71 of the lamp filament is adapted to make electrical contact with the screw 64, whereas the other terminal of the filament is connected with the socket member 69 and through the latter, with the stirrup 62.

A battery 72 is enclosed within the handle member 60 and has a terminal 73 in electrical contact with one end of the stirrup 62. The other terminal of the battery is engaged by a plunger 74 having a head 75 disposed in a metallic shell 76, the latter being fitted in a sleeve or socket member 77 tapped into the other end of the tubular handle member 60. One end 78 of the shell 76 is crimped over to prevent escape of the plunger from the shell and a spring 79 is located within the shell between the bottom thereof and the head 75 of the plunger and tends to maintain the latter in contact with the battery 72 and to move the battery forwardly and thereby maintain a good electrical contact between the forward battery terminal 73 and the stirrup.

Handle member 60 is provided with a plurality of holes 80 and the stirrup 62 with corresponding holes 81, whereby the light from the lamp 70 may be readily viewed by the inspector.

The operation of the testing means just described is as follows: When the inspector inserts the testing implement into the telltale hole 5 of a staybolt and moves it to the limit of its movement therein, if the contact point 13 makes electrical contact with the original closed outer end of the telltale hole, the lamp circuit will be closed and the lamp illuminated. This circuit may be traced as follows: From the battery terminal 73, through the stirrup 62 to the lamp filament, thence by way of the conductor 66 to the contact point 13, and from the contact point 13 through the bolt to the tube 7 at any point where said tube may engage the wall of the telltale hole and finally through the tube 7, handle member 60, member 77 and plunger 74 to the other battery terminal.

Where the wall of the telltale hole is utilized to make electrical connection with the tube 7 of the testing implement in order to close the electric circuit through the indicating device, it is desirable to provide the said wall with a coating or covering of some material which will prevent rust or corrosion from forming on said wall, due to the condensation thereon of moisture seeping through the porous plug in the inner end of the telltale hole. A coating or covering 82 may be formed on the wall of the telltale hole by the electro deposition thereon of a suitable noncorrosive metal, such as copper. Where this covering or coating is provided, it may be extended to cover the end wall of the telltale hole and the separate slug disclosed in Figure 1 may be dispensed with, as previously explained.

The construction shown in Figure 10 differs from that disclosed in Figures 6 to 9 inclusive, in that the battery is not housed within the tubular handle member. In the construction shown in this figure, the end of the stirrup 62 is engaged by a plunger 83, the head of which is located within a shell 84 carried by, but insulated from, a sleeve or socket member 85 tapped into one end of the tubular handle member 60. A coil spring 86 within the shell 84 engages the plunger and maintains it in contact with the stirrup 62. An insulated conductor 87 has one end secured to the shell 84 by means of a binding screw 88, the said conductor passing into and through the bore of the shell and out through the member 85. Said conductor is connected at its other end to one terminal of a battery 89. An insulated conductor 90 is connected at one end to the other terminal of the battery and is adapted to be connected at its other end to the boiler shell 2.

The advantages of the present invention arise from the provision of a testing means of simple construction, whereby an inspector is enabled to ascertain with certainty whether the telltale hole of a staybolt is open and unobstructed throughout the entire length thereof.

Where the expression "original closed end" is used in any of the appended claims, such term is to be interpreted as meaning the position at the closed end of the telltale hole as it existed in the completed bolt ready for service, before any extraneous material accumulated in the hole to alter the position of the closed end thereof.

I claim:

1. Means for testing the condition of the telltale hole of a staybolt when such hole is closed at one end and regardless of whether the length of said hole is known or unknown, comprising a testing implement adapted for insertion into said telltale hole, and means associated with said implement and adapted to indicate whether said implement has reached the original closed end of said telltale hole, substantially as described.

2. Means for testing the condition of the telltale hole of a staybolt when such hole is closed at one end and regardless of whether the length of said hole is known or unknown, comprising a testing implement adapted for insertion into said telltale hole, and indicating means associated with said implement and adapted to function upon said implement reaching and making contact with the original closed end of said telltale hole, substantially as described.

3. Means for testing the condition of the telltale hole of a staybolt when such hole is closed at one end and regardless of whether the length of said hole is known or unknown, comprising a testing implement adapted for insertion into said telltale hole, and electrical means associated with said implement and adapted to indicate whether said implement has reached the original closed end of said telltale hole, substantially as described.

4. Means for testing the condition of the telltale hole of a staybolt when such hole is closed at one end and regardless of whether the length of said hole is known or unknown, comprising an electric contact member adapted to be inserted into and moved in said hole to make contact with the original closed end thereof, electrical indicating means associated with said member, means whereby an electric circuit through said indicating means is completed when said contact member reaches and makes contact with said original closed end, and means associated with said member for preventing same from making electrical contact with the said walls of said hole during movement therein, substantially as described.

5. Means for testing the condition of the telltale hole of a staybolt when such hole is closed at one end and regardless of whether the length of said hole is known or unknown, comprising a tubular member adapted for insertion into said telltale hole, an electric contact member mounted upon one end of said tubular member and insulated therefrom, an electrical indicator, and means whereby an electric circuit through said indicator is completed when said contact member reaches and makes contact with the original closed end of said telltale hole, said means comprising an insulated conductor extending through the bore of said tubular member and connected at one end to said contact member, substantially as described.

6. Means for testing the condition of the telltale hole of a staybolt when such hole is closed at one end and regardless of whether the length of said hole is known or unknown, comprising a testing implement adapted to be inserted into said telltale hole and having a contact member at one end thereof, an electrical indicator, and means whereby an electric circuit through said indicator is completed when said contact member reaches and makes contact with the original closed end of said telltale hole, said means comprising a flexible conductor forming one terminal of said circuit and adapted for temporary electrical connection with a part to which the staybolt may be connected, substantially as described.

7. Means for testing the condition of the telltale hole of a staybolt when such hole is closed at one end and regardless of whether the length of said hole is known or unknown, comprising a hollow handle member, a testing member carried by said handle member and adapted for insertion into said telltale hole, a contact member mounted on the free end of said testing member and insulated therefrom, an electrical indicator enclosed within said handle member, and means whereby an electric current through said indicator is completed when said contact member reaches and makes contact with the original closed end of said telltale hole, substantially as described.

8. Means for testing the condition of the telltale hole of a staybolt when such hole is closed at one end and regardless of whether the length of said hole is known or unknown, comprising a hollow handle member, a testing member carried by said handle member and adapted for insertion into said telltale hole, a contact member mounted on the free end of said testing member and insulated therefrom, an electrical indicator enclosed within said handle member, a battery, and means whereby an electric circuit through said indicator and battery is completed when said contact member reaches and makes contact with the original closed end of said telltale hole, substantially as described.

9. Means for testing the condition of the telltale hole of a staybolt when such hole is closed at one end and regardless of whether the length of said hole is known or unknown, comprising a hollow handle member having an opening in its wall, an electric lamp enclosed within said handle member opposite the said opening, a testing member carried by said handle member and adapted for insertion into said telltale hole, a contact member mounted on the free end of said testing member and insulated therefrom, and means whereby an electric circuit through said lamp is completed when said contact member reaches and makes contact with the original closed end of said telltale hole, substantially as described.

In testimony whereof I have hereunto set my hand.

GROVER R. GREENSLADE.